Patented Mar. 14, 1933

1,901,322

UNITED STATES PATENT OFFICE

WILHELM NEELMEIER, EUGEN RIMELE, AND EUGEN GLIETENBERG, OF LEVERKUSEN-ON-THE-RHINE, GERMANY, ASSIGNORS TO GENERAL ANILINE WORKS, INC., OF NEW YORK, N. Y., A CORPORATION OF DELAWARE

MONOACYLATED 2.5-DIAMINOHYDROQUINONEETHERS

No Drawing. Application filed December 5, 1930, Serial No. 500,416, and in Germany December 24, 1929.

The present invention relates to the manufacture of monoacylated 2.5-diaminohydroquinone-ethers and to the new products obtainable thereby, more particularly it relates to compounds of the general formula:

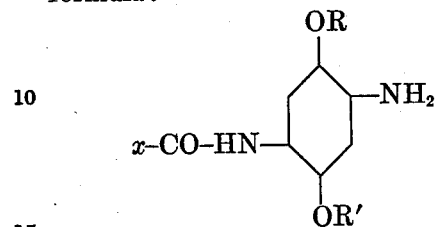

in which R and R' represent alkyl and $x$ aryl or aralkyl groups.

Our new products are obtainable by acylating in the usual manner the corresponding monoaminohydroquinonedialkylethers of the formula:

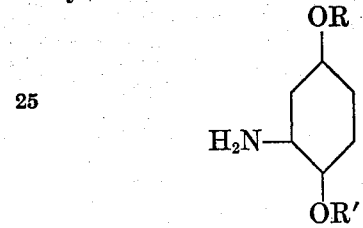

by treatment with an organic carboxylic acid halide, then nitrating the resulting product in an indifferent solvent or in aqueous suspension with or without the addition of sulfuric acid and reducing the resulting nitro compound according to the customary methods, for example with iron and acetic acid; or otherwise our new compounds are obtainable alternatively by converting a nitroaminohydroquinonedialkylether of the general formula:

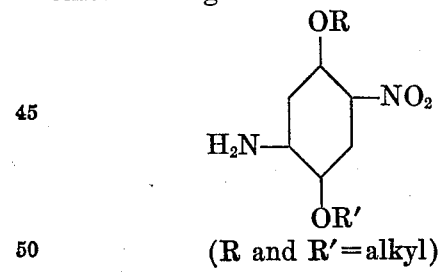

(R and R'=alkyl)

obtainable according to German Patent No. 141,975 or by the saponification of nitrated acylaminohydroquinonedialkylethers (see Berichte der Deutschen Chemischen Gesellschaft, vol. 17, page 2121) into acyl compounds, which are then subjected to reduction.

The new bases are generally white to yellowish crystalline substances, insoluble or scarcely soluble in water and are valuable intermediate products in the manufacture of dyestuffs.

The following examples illustrate the invention without limiting it thereto:

EXAMPLE 1

(a) *2-benzoylaminohydroquinonedimethylether*

153 kgs. of aminohydroquinonedimethylether are caused to melt in 1000 litres of water at about 80° C., 60 kgs. of sodium carbonate are added and 141 kgs. of benzoylchloride are run in in a thin stream with vigorous stirring at 80–85° C. After further stirring for half an hour, cold water is allowed to flow in, whereupon the molten benzoyl compound solidifies in small globules. These are filtered by suction and washed, the melting point is 85–87° C. (from alcohol).

(b) *5-nitro-2-benzoylaminohydroquinonedimethylether*

257 kgs. of finely ground benzoylaminohydroquinonedimethylether are added to 1000 litres of 14% nitric acid with stirring. The temperature rises to about 45° C. and is then increased to 80–90° C. by means of steam, this temperature being maintained for some 3 hours. The voluminous yellow paste is diluted with cold water, filtered with suction and washed until neutral. The melting point is 170°C.

257 kgs. of benzoylaminohydroquinonedimethylether are dissolved in about 5 times the quantity of hot glacial acetic acid. On cooling while stirring, part of the substance separates again in fine small crystals. 80 kgs. of 80% nitric acid are now slowly run in at room temperature, whereby the starting material dissolves completely and the nitro compound crystallizes out gradually in long needles. These are filtered by suction, washed and dried. The product is identical with that described in Example 1 (b), paragraph 1.

(c) *5-amino-2-benzoylaminohydroquinone-dimethylether*

In a vessel containing a mixture of 600 kgs. of iron, 100 litres of water, 20 kgs. of hydrochloric acid and 3000 litres of alcohol there are gradually added at about 75° C. 302 kgs. of 5-nitro-2-benzoylaminohydroquinonedimethylether. After stirring for some hours at boiling temperature the yellow color of the nitroether disappears. Then there are added 10 kgs. of sodium carbonate, the mass is boiled for some minutes and filtered by suction from the iron residue. On cooling the amino compound of the formula:

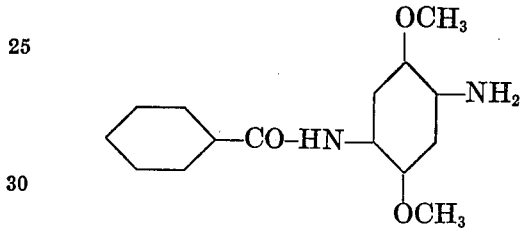

crystallizes out in white needles of the melting point 168° C.

Example 2

(a) *2-benzoylaminohydroquinonediethylether*

181 kgs. of aminohydroquinonediethylether are dissolved in 200 kgs. of pyridine at 40° C. and 141 kgs. of benzoylchloride are gradually added with stirring. The temperature rises to 90–100° C. This temperature is maintained by cooling with water. The separation of the benzoyl compound soon begins and finally a thick magma results. This is mixed with water, filtered with suction and dried. The melting point is 87–89° C.

(b) *5-nitro-2-benzoylaminohydroquinonediethylether*

285 kgs. of benzoylaminohydroquinonediethylether are nitrated with about the same quantities of dilute nitric acid and in the same manner as indicated in Example 1 (b). The melting point of the product is 145° C.

The excess of nitric acid employed in Example 1 (b), paragraph 1 can be reduced by partially replacing it by sulfuric acid.

(c) *5-amino-2-benzoylaminohydroquinone-diethylether*

500 kgs. of iron powder, 500 litres of water and 20 kgs. of hydrochloric acid are mixed in a vessel employed for the reduction. Then 330 kgs. of 5-nitro-2-benzoylaminohydroquinonediethylether are gradually introduced at 90–95° C. The reduction is complete after stirring for some hours. 10 kgs. of sodium carbonate are then added and after filtering and extracting the iron residue with hot alcohol or benzene, the extraction liquid is concentrated. The 5-amino-2-benzoylaminohydroquinonediethylether of the formula:

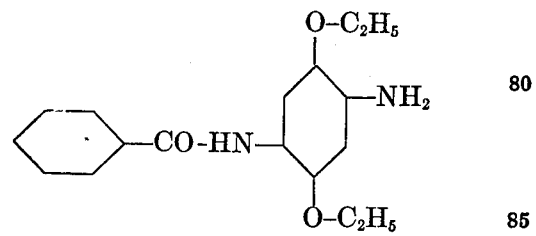

crystallizes therefrom in white needles. The melting point is 101° C.

Example 3

(a) *5-nitro-benzoylamino-1-methoxy-4-ethoxybenzene*

212 kgs. of 5-nitro-2-amino-1-methoxy-4-ethoxybenzene (German Patent No. 141,975) are treated with 141 kgs. of benzoylchloride as described in Example 2 (a). The well crystallized benzoyl compound melts at 126° C.

(b) *5-amino-2-benzoylamino-1-methoxy-4-ethoxybenzene*

316 kgs. of 5-nitro-2-benzoylamino-1-methoxy-4-ethoxybenzene are reduced according to the directions of Example 2 (c) and the reduction product is separated from the iron by solution in alcohol. The melting point is 120–121° C.

In an analogous manner to the above examples other monoaroyl compounds or monoaralkyl compounds of diaminohydroquinoneethers can be produced.

By employing, for example, instead of benzoyl chloride in Example 2 (a) a chlorinated derivative, such as 2.5-dichlorobenzoylchloride, nitrating and reducing and proceeding from aminohydroquinonedimethylether, 5-(2'.5'-dichlorobenzoylamino)-2-aminohydroquinonedimethylether is obtained of the melting point 164–165° C.

When 5-nitro-2-amino-hydroquinonedimethylether (see German Patent No. 141,975) is treated in pyridine with one molecular proportion of o-chlorophenoxy-acetic acid chloride in the same manner as in Example 2 (a), the corresponding o-chlorophenoxyacetyl compound is obtained, melting at 209–210° C.

By reduction with iron and extraction with alcohol 5-amino-2-o-chlorophenoxyacetylaminohydroquinonedimethylether is obtained therefrom, melting at 125–126° C.

By employing phenylacetic acid chloride or cinnamic acid chloride in an analogous manner the corresponding phenyl acetyl or cinnamyl bases are obtained.

We claim:

1. The process which comprises treating a monoaminohydroquinonedialkylether of the general formula:

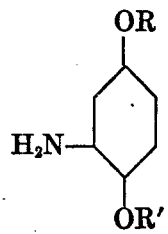

wherein R and R' stand for alkyl groups with a member of the group consisting of the aromatic and aromatic-aliphatic carboxylic acid halides, nitrating the acylamino compound and reducing the nitro group of the nitro-acylamino compound to the amino group.

2. The process which comprises treating a monoaminohydroquinonedialkylether of the general formula:

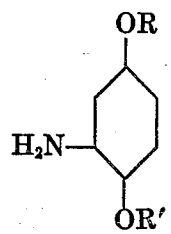

wherein R and R' stand for alkyl groups from one to two carbon atoms, with a member of the group consisting of the aromatic and aromatic-aliphatic carboxylic acid halides, nitrating the acylamino compound and reducing the nitro group of the nitro-acylamino compound to the amino group.

3. The process which comprises treating a monoaminohydroquinonedialkylether of the general formula:

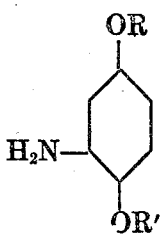

wherein R and R' stand for alkyl groups, with benzoylchloride, nitrating the acylamino compound and reducing the nitro group of the nitro-acylumino compound to the amino group.

4. The process which comprises treating a monoaminohydroquinonedialkylether of the general formula:

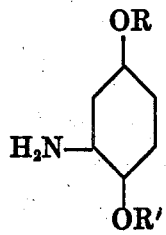

wherein R and R' stand for alkyl groups from one to two carbon atoms, with benzoylchloride, nitrating the acylamino compound and reducing the nitro group of the nitro-acylamino compound to the amino group.

5. The process which comprises treating monoaminohydroquinonediethylether with benzoylchloride nitrating the acylamino compound and reducing the nitro group of the nitro-acylamino compound to the amino group.

6. As new products monoacylated 2.5-diaminohydroquinoneethers of the general formula:

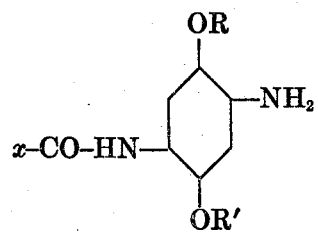

wherein R and R' stand for alkyl groups and $x$ stands for one of the radicals aryl and aralkyl, being generally white to yellowish crystalline substances, insoluble or scarcely soluble in water and being valuable intermediate products in the manufacture of dyestuffs.

7. As new products monoacylated 2.5-diaminohydroquinoneethers of the general formula:

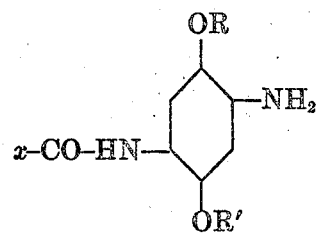

wherein R and R' stand for alkyl groups from one to two carbon atoms, and $x$ stands for one of the radicals aryl and aralkyl, being generally white to yellowish crystalline substances, insoluble or scarcely soluble in water and being valuable intermediate products in the manufacture of dyestuffs.

8. As new products monoacylated 2.5-diaminohydroquinoneethers of the general formula:

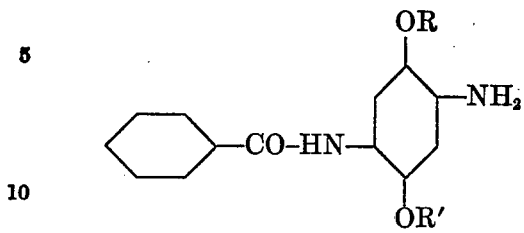

wherein R and R' stand for alkyl groups from one to two carbon atoms, being generally white to yellowish crystalline substances, insoluble or scarcely soluble in water and being valuable intermediate products in the manufacture of dyestuffs.

9. As a new product the compound of the probable formula:

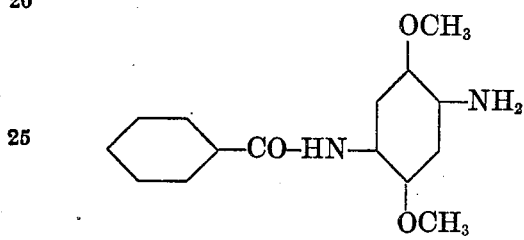

being a white crystalline substance of the melting point 168° C., being a valuable intermediate product in the manufacture of dyestuffs.

10. As a new product, the compound of the probable formula:

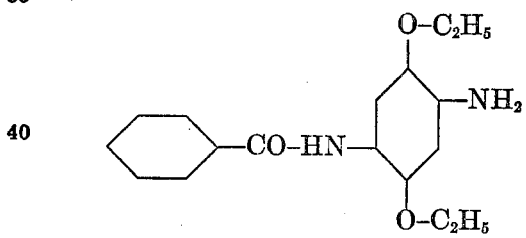

being a white crystalline substance of the melting point 101° C., and being a valuable intermediate product in the manufacture of dyestuffs.

In testimony whereof, we affix our signatures.

WILHELM NEELMEIER.
EUGEN RIMELE.
EUGEN GLIETENBERG.